United States Patent
Nakata et al.

(12) 
(10) Patent No.: US 9,051,709 B1
(45) Date of Patent: Jun. 9, 2015

(54) WORK VEHICLE

(71) Applicant: KOMATSU LTD., Tokyo (JP)

(72) Inventors: Kazushi Nakata, Komatsu (JP);
Yuuichirou Kitagawa, Komatsu (JP);
Mitsutaka Nakamura, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/351,913

(22) PCT Filed: Feb. 21, 2014

(86) PCT No.: PCT/JP2014/054161
§ 371 (c)(1),
(2) Date: Apr. 15, 2014

(87) PCT Pub. No.: WO2014/185112
PCT Pub. Date: Nov. 20, 2014

(51) Int. Cl.
*B62D 25/10* (2006.01)
*E02F 9/08* (2006.01)

(52) U.S. Cl.
CPC ............. *E02F 9/0866* (2013.01); *E02F 9/0891* (2013.01); *B62D 25/10* (2013.01)

(58) Field of Classification Search
CPC ....... B62D 25/10; B62D 25/12; E02F 9/0866; E02F 9/0891
USPC ................. 180/69.2, 69.24, 68.4; 296/193.11
See application file for complete search history.

(56) References Cited

U.S. PATENT DOCUMENTS

| | | | | | |
|---|---|---|---|---|---|
| 3,583,513 | A | * | 6/1971 | Macadam et al. | 180/69.24 |
| 4,037,682 | A | * | 7/1977 | Sandrock et al. | 180/69.2 |
| 4,287,961 | A | * | 9/1981 | Steiger | 180/68.4 |
| 6,976,513 | B2 | * | 12/2005 | Schlachter | 141/88 |
| 7,591,334 | B2 | * | 9/2009 | Eckersley et al. | 180/69.24 |
| 7,677,631 | B1 | * | 3/2010 | Zischke et al. | 296/97.22 |
| 7,862,107 | B2 | * | 1/2011 | Oba et al. | 296/193.11 |
| 2001/0027624 | A1 | * | 10/2001 | Randolph | 52/19 |
| 2002/0017408 | A1 | | 2/2002 | Oshikawa et al. | |
| 2013/0001005 | A1 | * | 1/2013 | Nakamura et al. | 180/296 |
| 2014/0190757 | A1 | * | 7/2014 | Kinoshita et al. | 180/69.24 |

FOREIGN PATENT DOCUMENTS

| | | |
|---|---|---|
| CN | 1337523 A | 2/2002 |
| JP | 7-34868 A | 2/1995 |
| JP | 2008-81953 A | 4/2008 |
| JP | 2009-85585 A | 4/2009 |

(Continued)

OTHER PUBLICATIONS

The International Search Report for the corresponding international application No. PCT/JP2014/054161, issued on Apr. 1, 2014.

(Continued)

*Primary Examiner* — John Walters
*Assistant Examiner* — Brian Swenson
(74) *Attorney, Agent, or Firm* — Global IP Counselors, LLP (57) ABSTRACT

A bulldozer is equipped with an engine, a radiator, a reservoir tank, and an engine hood. The reservoir tank is connected to the radiator. The engine hood has a body section and a case section. The body section defines an upper section of the engine room. The case section is disposed on an inside surface of the body section and accommodates the reservoir tank.

13 Claims, 6 Drawing Sheets

(56) References Cited

FOREIGN PATENT DOCUMENTS

| JP | 2011-220033 A | 11/2011 |
| WO | 2013/057902 A1 | 4/2013 |

OTHER PUBLICATIONS

The Office Action for the corresponding Chinese patent application No. 20148000192.4, issued on Mar. 25, 2015.

* cited by examiner

FIG. 6

WORK VEHICLE

CROSS-REFERENCE TO RELATED APPLICATIONS

This application is a U.S. National stage application of International Application No. PCT/JP2014/054161, filed on Feb. 21, 2014.

BACKGROUND

Field of the Invention

The present invention relates to a work vehicle.

Background Information A work vehicle is equipped with a radiator for cooling a liquid coolant for the engine. The work vehicle is also equipped with a reservoir tank that is connected to the radiator and that stores a portion of the liquid coolant. The radiator and the reservoir tank are accommodated inside an engine room.

A work vehicle having an exhaust gas post-processing device mounted therein for treating exhaust gas from the engine has been proposed recently. The exhaust gas post-processing device includes a diesel particulate filter and a selective catalyst reduction device. These devices are normally mounted inside the engine room.

SUMMARY

The abovementioned exhaust gas post-processing device generates heat when operating. As a result, there is a problem that the reservoir tank accommodated inside the engine room with the exhaust gas post-processing device is exposed to hot air inside the engine room and to radiant heat from the exhaust gas post-processing device. Even when the exhaust gas post-processing device is not mounted therein, the same problem exists because the temperature inside the engine room rises due to the engine and other devices.

An object of the present invention is to reduce the exposure of the reservoir tank to high temperatures.

A work vehicle according to an exemplary embodiment of the present invention is equipped with an engine, a radiator, a reservoir tank, and an engine hood. The radiator cools a liquid coolant for the engine. The reservoir tank is connected to the radiator. The reservoir tank stores a portion of the liquid coolant. The engine hood has a body section and a case section. The body section defines an upper section of an engine room that accommodates the engine. The case section is disposed on the inside surface of the body section. The case section accommodates the reservoir tank.

According to the above-mentioned exemplary embodiment of the present invention, the reservoir tank is accommodated inside a space partitioned by the case section. As a result, even when a heat source, such as the exhaust gas post-processing device, is arranged inside the engine room, exposure of the reservoir tank to radiant heat from the exhaust gas post-processing device and the like may be reduced. Even when the temperature inside the engine room rises due to the generation of heat from the exhaust gas post-processing device and the like, the exposure of the reservoir tank to the heat inside the engine room is reduced.

The body section preferably has an opening section. The case section is in communication with the outside through the opening section. According to this configuration, access to the reservoir tank accommodated inside the case section from the outside may be facilitated.

The engine hood preferably has a lid section that covers the opening section. According to this configuration, the intrusion of rainwater and the like into the case section may be prevented by the lid section.

The body section preferably has an upper plate and a side plate. The opening section is formed across the upper plate and the side plate. According to this configuration, the reservoir tank accommodated inside the case section may be easily removed. Further, the reservoir tank may be easily accommodated inside the case section.

The work vehicle preferably has an exhaust pipe connected to the case section. According to this configuration, rainwater and the liquid coolant pooled inside the case section may be exhausted to the outside of the case section through the exhaust pipe. The exhaust pipe more preferably extends to the outside of the engine room.

A window section is preferably formed in a side surface of the case section. According to this configuration, the contents of the liquid coolant inside the reservoir tank may be easily confirmed through the window section.

The work vehicle is preferably equipped with a connecting pipe that connects the reservoir tank and the radiator. The connecting pipe is arranged along a lower surface of the body section. According to this configuration, the connecting pipe is not a hindrance when performing exchange work or maintenance work on the devices inside the engine room.

The work vehicle is preferably equipped with a holding member. The holding member is disposed inside the case section and holds the reservoir tank. The holding member more preferably has first and second holding sections formed along an external periphery of the reservoir tank. According to this configuration, the reservoir tank may be held securely inside the case section.

The work vehicle is preferably equipped with an exhaust gas post-processing device. The exhaust gas post-processing device has a diesel particulate filtering device and a selective catalyst reduction device. The radiator, the exhaust gas post-processing device, and the reservoir tank are arranged in order from the front.

According to an exemplary embodiment of the present invention, an installation space for a reservoir tank may be assured while maintaining the size of the engine room.

DESCRIPTION OF EXEMPLARY EMBODIMENTS

Figure 1:
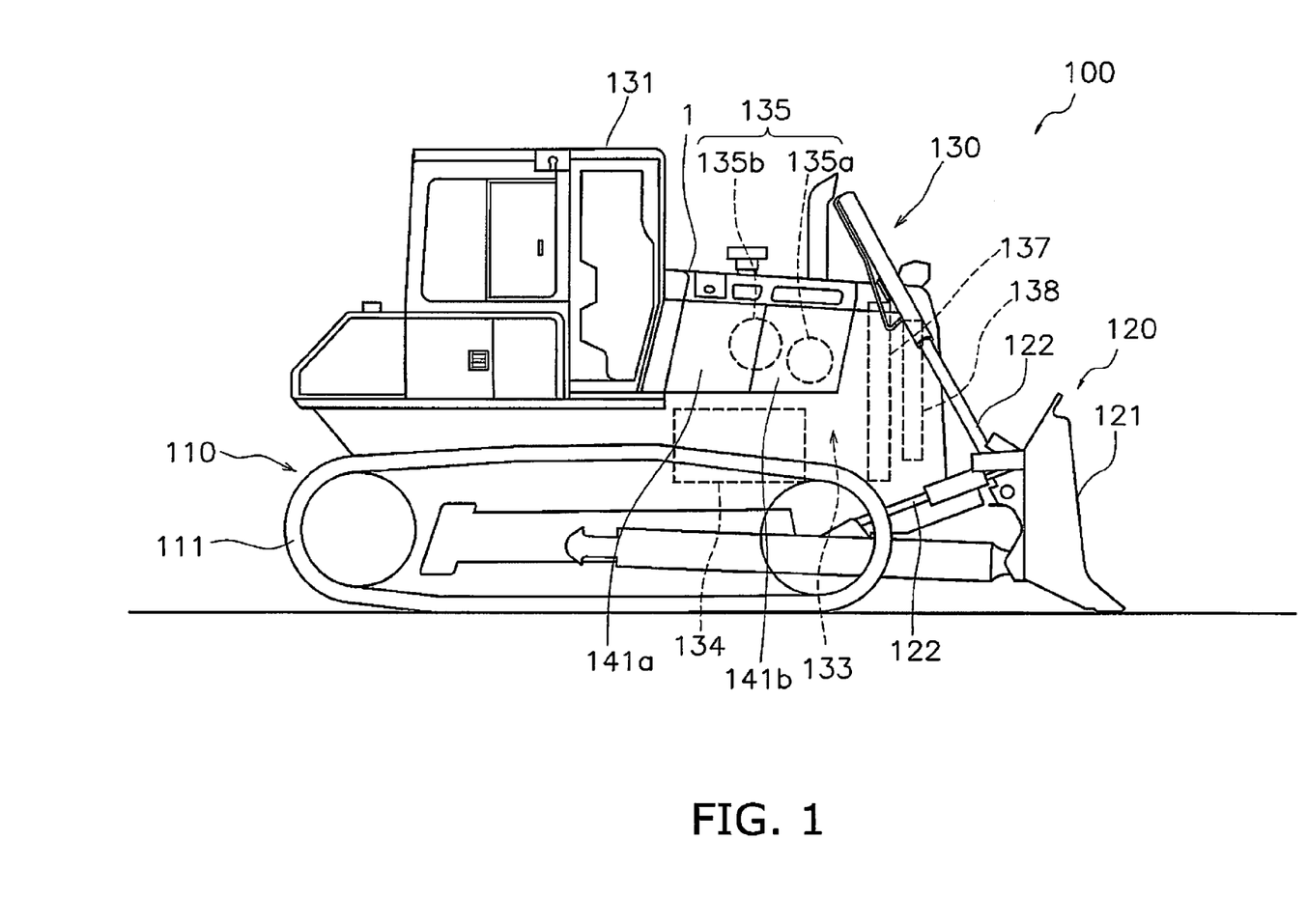
FIG. 1 is a side elevational view of a bulldozer.

A bulldozer that is an exemplary embodiment of the work vehicle according to the present invention will be explained below with reference to the drawings. FIG. 1 is a side view of a bulldozer. In the following explanation, "front" and "rear" refer to the front and the rear of a bulldozer 100. That is, the right side is the "front" and the left side is the "rear" in FIG. 1. In the following explanation, "right," "left," "up," and "down" indicate directions relative to a state of looking forward from the operating cabin, and "vehicle width direction"

and "crosswise direction" have the same meaning. Moreover, the front-back direction signifies the front-back direction of the bulldozer.

As illustrated in FIG. 1, the bulldozer 100 is equipped with a travel device 110, a work implement 120, and a vehicle body 130. The travel device 110 is a device for enabling the vehicle to travel and is attached to the vehicle body 130. The travel device 110 has a pair of crawler belts 111, and the bulldozer 100 travels due to the crawler belts 111 being driven.

The work implement 120 is provided at the front of the vehicle body 130. The work equipment 120 includes a blade 121 and a plurality of hydraulic cylinders 122. The blade 121 is provided in a manner that allows swinging upward and downward. The hydraulic cylinders 122 change the orientation of the blade 121.

The vehicle body 130 has a cab 131, a vehicle frame 132 (See FIG. 3), and an engine room 133. The upper section of the engine room 133 is covered by an engine hood 1. An engine 134, an exhaust gas post-processing device 135, a radiator 137, and a cooling fan 138 are arranged inside the engine room 133.

The exhaust gas post-processing device 135 has a diesel particulate filtering device 135a and a selective catalyst reduction device 135b. The selective catalyst reduction device 135b is arranged to the rear of the diesel particulate filtering device 135a. The devices inside the engine room 133 are arranged in the order of the cooling fan 138, the radiator 137, and the exhaust gas post-processing device 135 from the front.

The radiator 137 cools a liquid coolant for the engine 134. Specifically, the liquid coolant having a high temperature due to the absorption of heat from the engine 134, flows inside the radiator 137. The liquid coolant flowing inside the radiator 137 is cooled due to the exchange of heat with cooling air that flows to the radiator 137. The cooling air is generated by the driving of a cooling fan 138. The cooling air flows toward the front.

Specifically, when the cooling fan 138 is driven, air from outside flows into the engine room 133 as the cooling air through a plurality of air vents 221 (FIG. 2) formed in a first side plate 22 and the like of the engine hood 1. The cooling air flows toward the front inside the engine room 133, passes through the radiator 137 and the cooling fan 138 to be exhausted from the engine room 133 toward the front.

Figure 2:
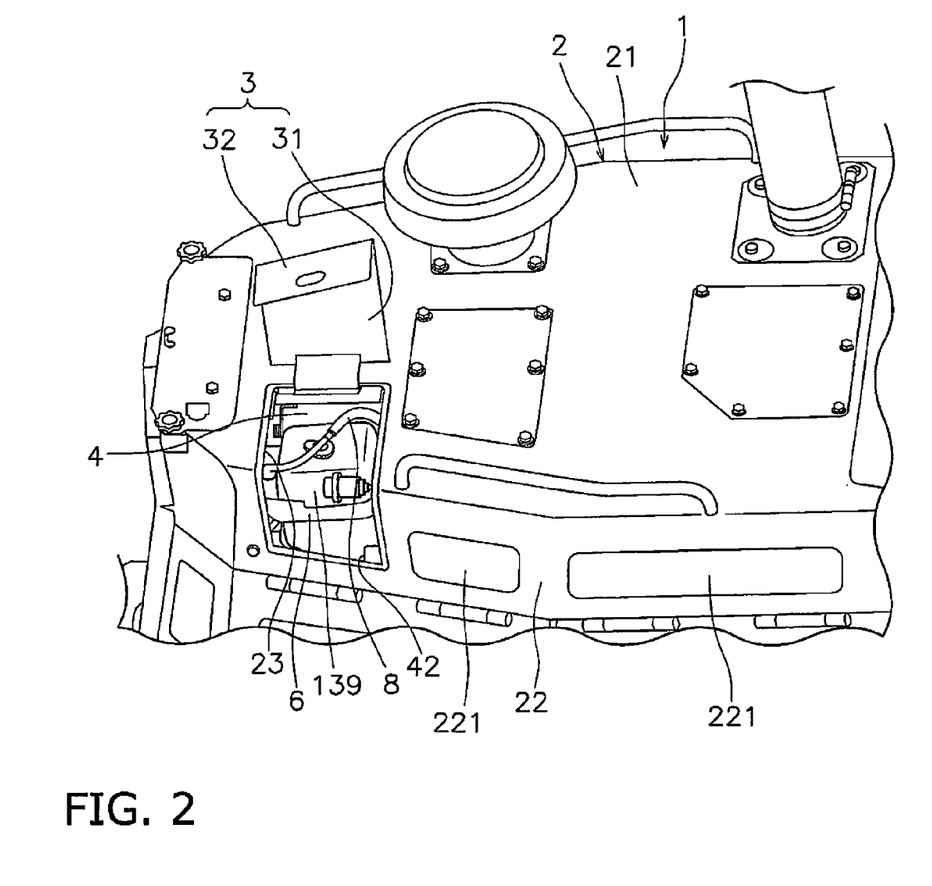
FIG. 2 is an upper perspective view of an engine hood.

FIG. 2 is a perspective view of the engine hood 1 as seen from the upper right direction. As illustrated in FIG. 2, the engine hood 1 has a body section 2 and a lid section 3. The body section 2 defines the upper section of the engine room 133. The body section 2 has an upper plate 21 and the first side plate 22. The first side plate 22 corresponds to the side plate of an exemplary embodiment of the present invention.

The upper plate 21 defines the upper surface of the engine room 133. The first side plate 22 extends downward from the right edge of the upper plate 21. The first side plate 22 defines the upper section of a right side surface of the engine room 133. The plurality of air vents 221 are formed in the first side plate 22.

As illustrated in FIG. 1, the right side surface of the engine room 133 is mainly defined by two side doors 141a and 141b. The side doors 141a and 141b are attached to the vehicle frame 132 via hinges in a manner that enables opening and closing.

The body section 2 further has a second side plate (not illustrated) that extends downward from the left edge of the upper plate 21. The second side plate defines the upper section of the left side surface of the engine room 133. The left side surface of the engine room 133 is also mainly defined by two side doors (not illustrated) in the same way as the right side surface of the engine room 133.

As illustrated in FIG. 2, the body section 2 further has an opening section 23. The opening section 23 is formed to cross the upper plate 21 and the first side plate 22. Specifically, the opening section 23 opens upward and opens laterally (to the right). A below-mentioned reservoir tank 139 may be accommodated in and removed from the case section 4 through the opening section 23.

The lid section 3 is configured to cover the opening section 23 of the body section 2. The lid section 3 is attached to the body section 2 via a hinge. As a result, the lid section 3 is attached to the body section 2 in a manner that enables opening and closing. The lid section 3 has a first lid section 31 and second lid section 32. The first lid section 31 covers the portion of the opening section 23 formed in the upper plate 21. The second lid section 32 covers the portion of the opening section 23 formed in the first side plate 22.

Figure 3:
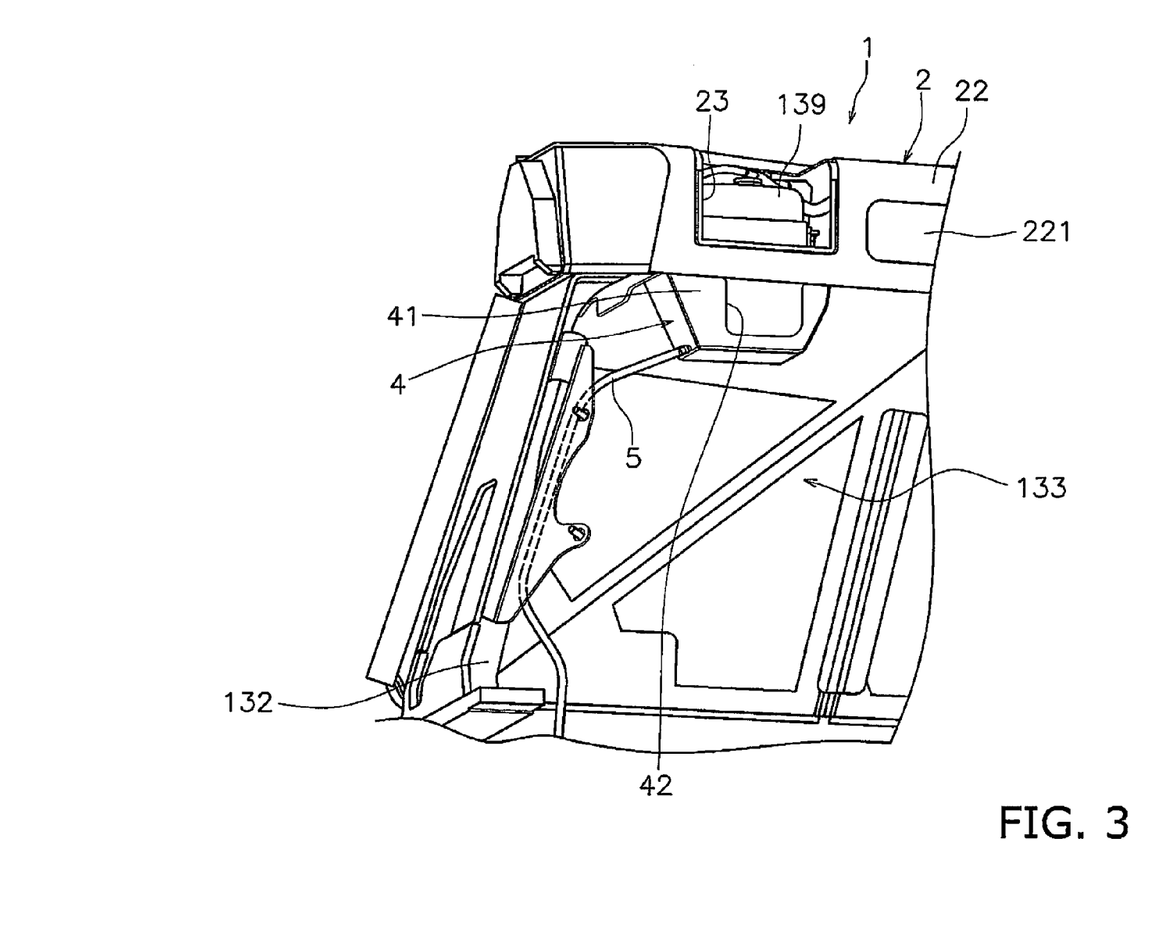
FIG. 3 is a side perspective view of the engine hood.

FIG. 3 is a perspective view of the engine hood 1 as seen from below. The two side covers 141a and 141b arranged on the right side are removed in FIG. 3. As illustrated in FIG. 3, the engine hood 1 further has the case section 4. The case section 4 is configured to accommodate the reservoir tank 139. The case section 4 is disposed on the inside surface (surface facing toward the engine room 133) of the body section 2. The reservoir tank 139 is accommodated inside an accommodating space formed by the case section 4 and the body section 2. The case section 4 is disposed on a first side section of the body section 2. Specifically, the case section 4 is disposed on the right side section of the body section 2. Moreover, the case section 4 is disposed in the rear section of the body section 2.

Specifically, the case section 4 has a substantially rectangular parallelepiped shape and is attached to the body section 2 to be suspended from the body section 2. The case section 4 is configured so that the surface area of the lower surface is smaller than that of the upper surface. The upper section of a first side surface (right side surface in the present embodiment) of the case section 4 and the upper surface of the case section 4 have an opening, and the opening of the case section 4 communicates with the opening section 23 of the body section 2. Consequently, the reservoir tank 139 may be accommodated in and removed from the case section 4 through the opening section 23 of the body section 2. Specifically, the case section 4 is in communication with the outside through the opening section 23. The first side surface of the case section 4 is the surface at the first side section on which the case section 4 is disposed.

The case section 4 may be formed by a metal plate but is not limited thereto. Radiant heat radiating from a heat source inside the engine room 133 toward the reservoir tank 139 may be blocked by the case section 4. The heat source inside the engine room 133 may include, for example, the exhaust gas post-processing device 135 and the engine 134.

A window section 42 is formed in a first side plate 41 of the case section 4. Specifically, the window section 42 is formed in the right side plate 41 of the case section 4. The window section 42 is formed by making a cutout in the first side plate 41 of the case section 4 from the upper edge toward the lower edge. As illustrated in FIG. 2, the amount of liquid coolant inside the reservoir tank 139 may be confirmed through the window section 42 when the lid section 3 is open.

As illustrated in FIG. 3, an exhaust pipe 5 is connected to the case section 4. Specifically, the exhaust pipe 5 is connected to the lower section of the case section 4. The exhaust pipe 5 extends to the outside of the engine room 133. Specifically, the exhaust pipe 5 has a first end section and a second end section. The first end section of the exhaust pipe 5 is in communication with the inside of the case section 4. The second end section of the exhaust pipe 5 is positioned on the outside of the engine room 133. As a result, a liquid pooled inside the case section 4 may be exhausted to the outside of the engine room 133 through the exhaust pipe 5.

As illustrated in FIG. 2, the reservoir tank 139 stores a portion of the liquid coolant for the engine 134. The reservoir tank 139 is a container having a substantially rectangular parallelepiped shape and is accommodated inside the case section 4. The reservoir tank 139 accommodated inside the case section 4 is positioned to the rear of the selective catalyst reduction device 135b. The reservoir tank 139 is held by a holding member 6 inside the case section 4. The holding member 6 has a first holding section 61 and a second holding section 62 as described below.

Figure 4:
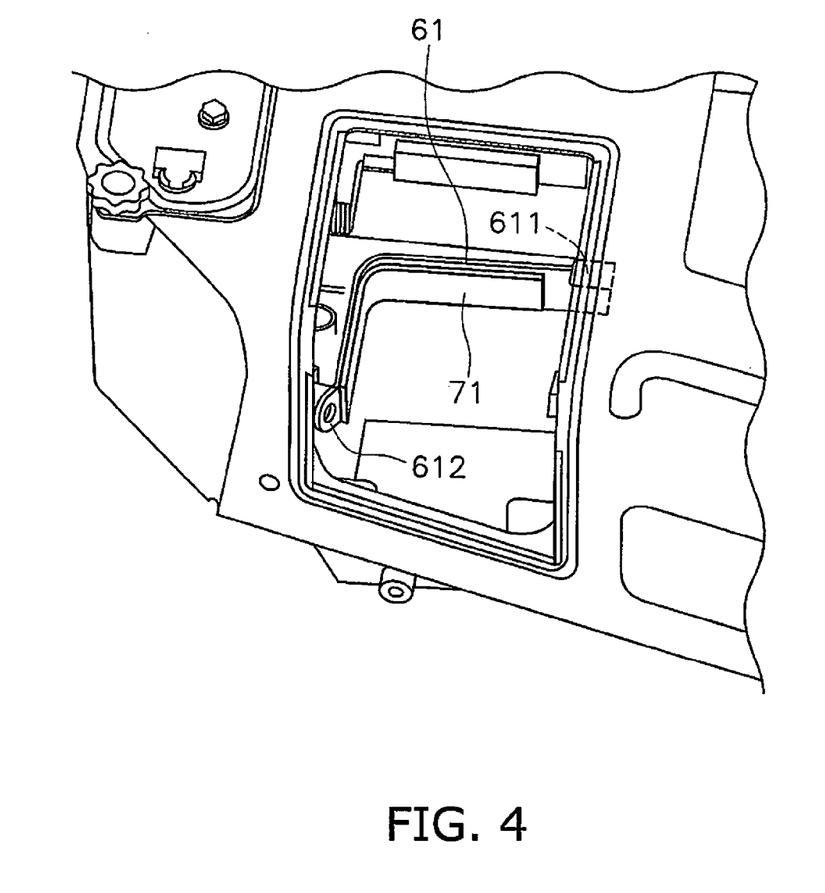
FIG. 4 is a perspective view of an interior of a case section.
Figure 5:
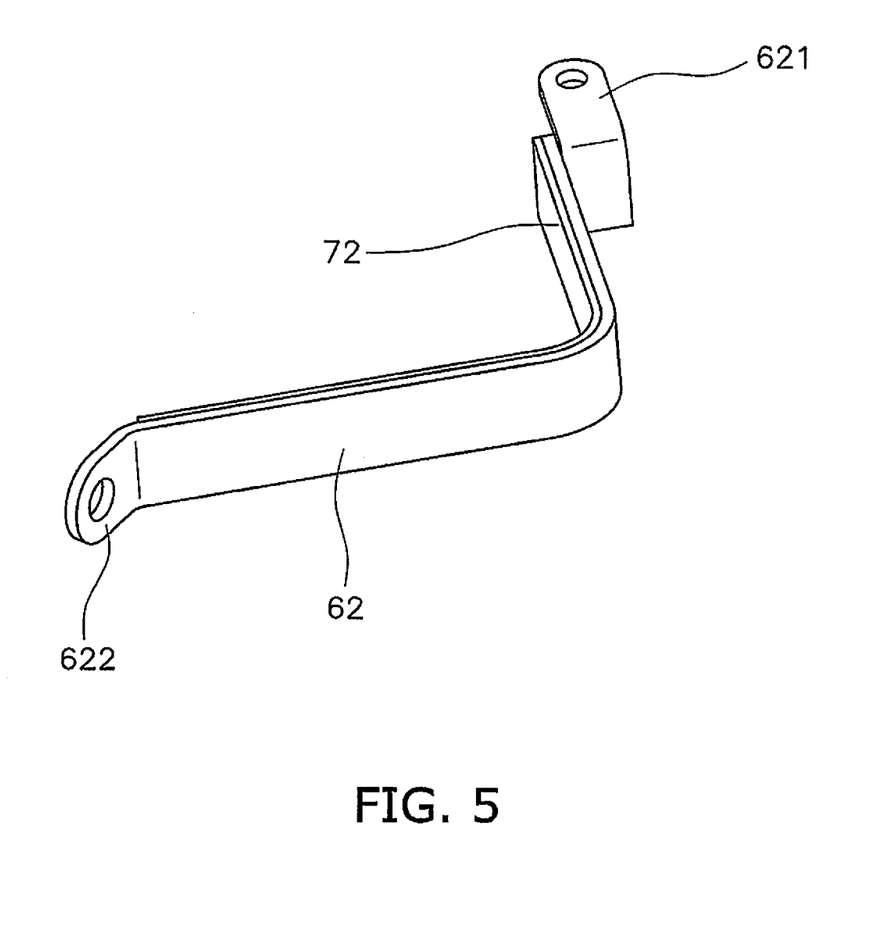
FIG. 5 is a perspective view of a second holding section.
Figure 6:
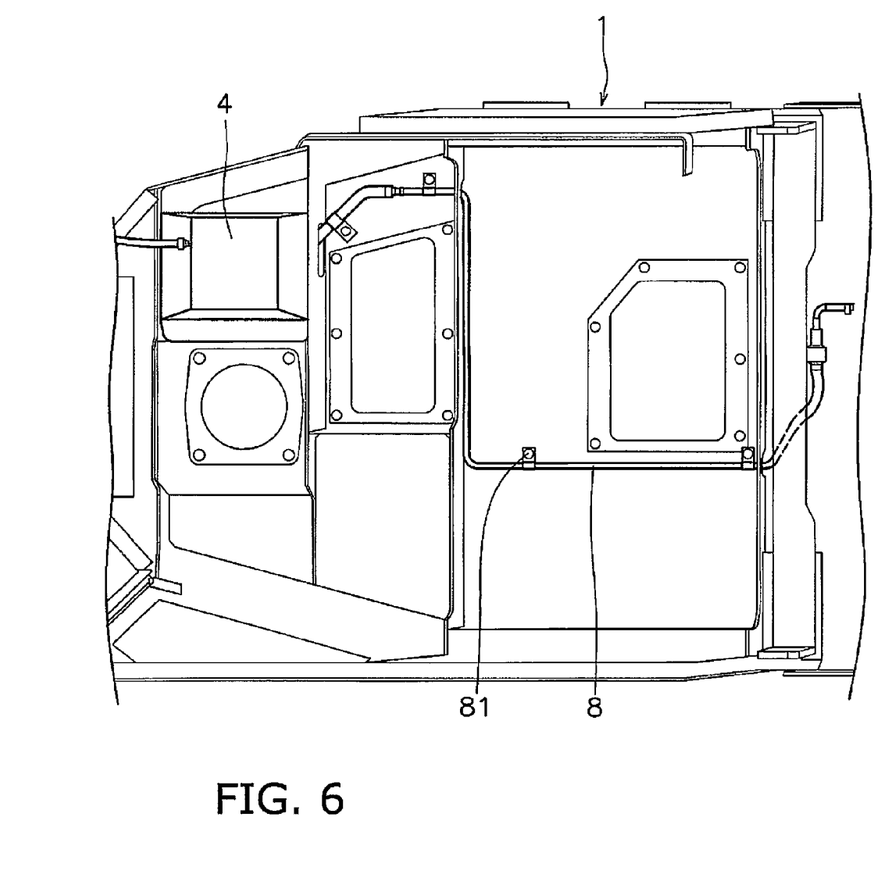
FIG. 6 is a bottom plan view of a bottom surface of the engine hood.

FIG. 4 is a perspective view of the interior of the case section 4. FIG. 5 is a perspective view illustrating the second holding section. As illustrated in FIG. 4, the first holding section 61 is disposed inside the case section 4. The first holding section 61 is approximately formed in an L shape. A first cushioning material 71 is provided on an inside surface of the first holding section 61.

As illustrated in FIG. 5, the second holding section 62 is approximately formed in an L shape. A second cushioning material 72 is provided on an inside surface of the second holding section 62. A first end section 621 of the second holding section 62 is fixed to a first end section 611 of the first holding section 61 with a fastening member, such as a bolt. A second end section 622 of the second holding section 62 is fixed to a second end section 612 of the first holding section 61 with a fastening member, such as a bolt.

The holding member 6 holds the reservoir tank 139 due to the first holding section 61 and the second holding section 62 being fastened to the external periphery side of the reservoir tank 139. When the holding member 6 is holding the reservoir tank 139, the first and second cushioning members 71 and 72 are compressed between the first and second holding members 61 and 62 and the reservoir tank 139.

As illustrated in FIG. 2, a connecting pipe 8 is connected to the reservoir tank 139. The connecting pipe 8 is a pipe for connecting the reservoir tank 139 and the radiator 137. The connecting pipe 8 is arranged along a lower surface of the body section 2 of the engine hood 1. Specifically, the connecting pipe 8 is supported by a plurality of attachment brackets 81 disposed on the lower surface of the body section 2 of the engine hood 1. The connecting pipe 8 extends through the case section 4 to reach the inside of the case section 4.

The bulldozer 100 according to exemplary embodiments of the present embodiment has the following features.

Generally, the engine room 133 in a work vehicle, such as the bulldozer 100, is preferably not too large. For example, when increasing the size of the engine room 133 in the bulldozer 100, there is a problem that visibility to the front is reduced. When increasing the size of the engine room in a wheel loader, there is a problem that visibility to the rear is reduced.

As a result, the size of the engine room 133 in the work vehicle is preferably maintained even if various devices, such as the exhaust gas post-processing device, are mounted in the work vehicle. As a result, various devices are arranged inside a limited space inside the engine room and a problem may arise in a conventional work vehicle that it is difficult to arrange a reservoir tank in the conventional position.

Accordingly in the above exemplary embodiments, the engine hood 1 has the case section 4 for accommodating the reservoir tank 139. The case section 4 is arranged to occupy a portion of the upper section of the engine room 133 because the case section 4 is disposed in the body section 2 of the engine hood 1. Because there is dead space in the upper section of the engine room 133, the reservoir tank 139 may be arranged to effectively make use of the dead space. Consequently, a disposition space for the reservoir tank 139 may be assured while maintaining the size of the engine room 133.

The reservoir tank 139 is accommodated inside the space partitioned by the case section 4. As a result, access to the reservoir tank 139 is facilitated without being hindered by various devices such as the exhaust gas post-processing device 135 or the engine 134.

The reservoir tank 139 is accommodated inside the space partitioned by the case section 4. As a result, exposure of the reservoir tank 139 to radiant heat from the exhaust gas post-processing device 135 or the engine 134 inside the engine room 133 may be reduced. Even when the temperature inside the engine room 133 rises due to the generation of heat from the exhaust gas post-processing device 135 and the like, the exposure of the reservoir tank 139 to the heat inside the engine room 133 may be reduced.

While an exemplary embodiment of the present invention has been described above, the present invention is not limited to such embodiment and the following modifications may be made within the scope of the present invention.

While the case section 4 is installed in the right rear section of the body section 2 in the above exemplary embodiment, the position in which the case section 4 is provided is not limited as such. For example, the case section 4 may be installed in the left rear section of the body section 2.

While the window section 42 is formed by cutting out a portion of the first side plate 41 of the case section 4 in the above exemplary embodiment, the formation of the window section 42 is not limited as such. The window section 42 may be configured so that the amount of the liquid coolant inside the reservoir tank 139 is confirmable. For example, the window section 42 may be configured by making at least a portion of the first side plate 41 of the case section 4 transparent.

While the present invention has been described as being applicable to a bulldozer in the above exemplary embodiment, the present invention may be applicable to another work vehicle. For example, the present invention is applicable to a wheel loader or a motor grader and the like.

What is claimed is:

1. A work vehicle, comprising:
an engine;
a radiator for cooling a liquid coolant for the engine;
a reservoir tank connected to the radiator and storing a portion of the liquid coolant; and
an engine hood having a body section and a case section, the body section defining an upper section of an engine room that accommodates the engine, the case section being disposed on an inside surface of the body section and accommodating the reservoir tank, the case section having at least two side plates and a bottom plate, the at least two side plates extending downward from the body section, the bottom plate being connected to the at least two side plates.

2. The work vehicle according to claim 1, wherein the body section has an opening section that allows communication between the inside of the case section and the outside.

3. The work vehicle according to claim 2, wherein the engine hood further has a lid section that covers the opening section.

4. The work vehicle according to claim 2, wherein the body section has an upper plate and a side plate; and the opening section is formed across the upper plate and the side plate.

5. The work vehicle according to claim 2, wherein the opening section is larger than the reservoir tank in a plan view.

6. The work vehicle according to claim 1, further comprising
an exhaust pipe connected to the case section.

7. The work vehicle according to claim 6, wherein the exhaust pipe extends to the outside of the engine room.

8. The work vehicle according to claim 1, wherein the case section has a window section formed in a side surface thereof.

9. The work vehicle according to claim 1, further comprising
a connecting pipe arranged along a lower surface of the body section and connecting the reservoir tank and the radiator.

10. The work vehicle according to claim 1, further comprising
a holding member disposed inside the case section to hold the reservoir tank.

11. The work vehicle according to claim 10, wherein the holding member has a first holding section and a second holding section formed along an external periphery of the reservoir tank.

12. A work vehicle, comprising:
an engine;
a radiator for cooling a liquid coolant for the engine;
a reservoir tank connected to the radiator and storing a portion of the liquid coolant; and
an engine hood having a body section and a case section, the body section defining an upper section of an engine room that accommodates the engine, the case section being disposed on an inside surface of the body section and accommodating the reservoir tank,
the body section having an opening section that allows communication between the inside of the case section and the outside, the body section having an upper plate and a side plate, the opening section being formed across the upper plate and the side plate.

13. A work vehicle, comprising:
an engine;
a radiator for cooling a liquid coolant for the engine;
a reservoir tank connected to the radiator and storing a portion of the liquid coolant;
an engine hood having a body section and a case section, the body section defining an upper section of an engine room that accommodates the engine, the case section being disposed on an inside surface of the body section and accommodating the reservoir tank; and
a holding member disposed inside the case section to hold the reservoir tank, the holding member having a first holding section and a second holding section formed along an external periphery of the reservoir tank.

* * * * *